P. V. HUNTER.
PROTECTION OF FEEDERS OF ELECTRICAL DISTRIBUTION SYSTEMS.
APPLICATION FILED OCT. 7, 1912.
1,091,225.
Patented Mar. 24, 1914.
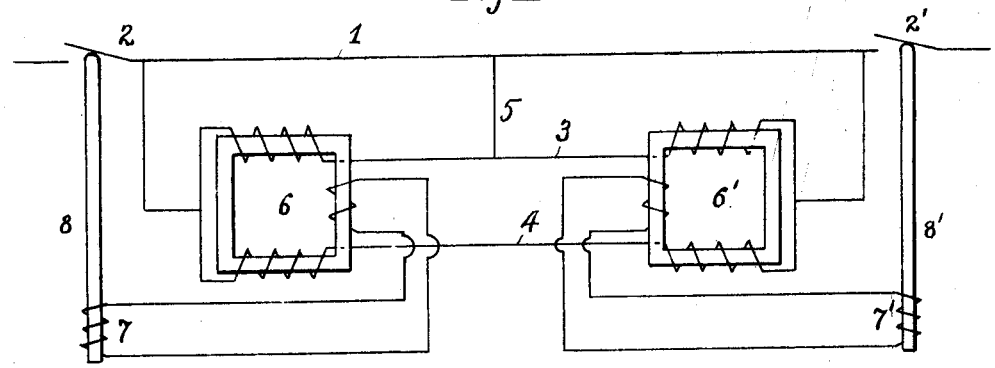
Fig. I.
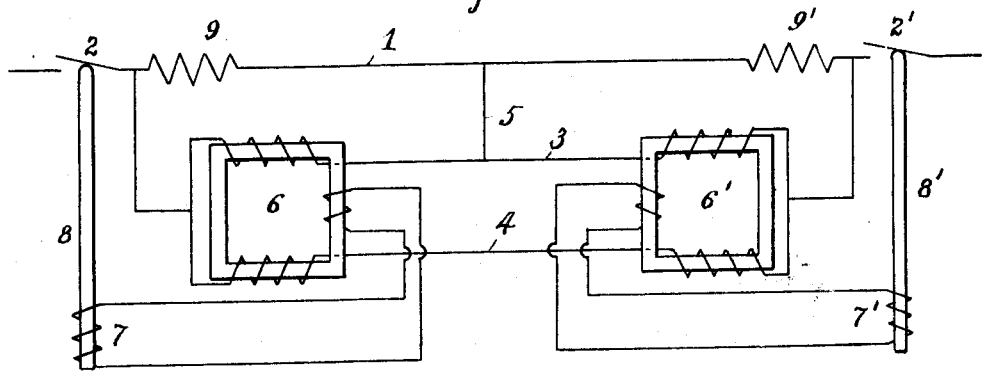
Fig. II.
WITNESSES:
Frederick Kunz
Louella F. Little
Inventor
Philip Vassar Hunter
by Gustav Bissing
Attorney

UNITED STATES PATENT OFFICE.

PHILIP VASSAR HUNTER, OF HEATON, ENGLAND.

PROTECTION OF FEEDERS OF ELECTRICAL DISTRIBUTION SYSTEMS.

1,091,225.  Specification of Letters Patent.  Patented Mar. 24, 1914.

Application filed October 7, 1912. Serial No. 724,343.

*To all whom it may concern:*

Be it known that I, PHILIP VASSAR HUNTER, residing at 41 Coquet Terrace, Heaton, Newcastle-upon-Tyne, in the county of Northumberland, England, have invented new and useful Improvements in or Connected with the Protection of Feeders of Electrical Distribution Systems, of which the following is a specification.

My invention relates to improvements in or connected with the protection of feeders of electrical distribution systems the object being to secure the opening of switches in the feeder circuit on leakage occurring from the feeder and at the same time to secure that the said switches shall remain inoperative whatever may be the current passing through the feeder under normal conditions.

In a preferred form of my invention I make the core of the feeder of a number of strands and lightly insulate two of these strands from one another and from the main part of the core of the cable. Such main part I shall hereinafter refer to as the "main core." The insulation between the two strands, hereinafter referred to as the "balancing strands," need not be more than merely sufficient to withstand the momentary voltage which may occur between the said strands and between them and the main core during the time that the switches take to operate on the occurrence of leakage. The said balancing strands are designed to convey a small portion of the feeding current such small portion being equal in each balancing strand. One of the said balancing strands is electrically connected to the main core at one point in its length. If equal sensibility of the automatic gear is required at both ends of the feeder the point of connection should be midway between the ends.

In order that my invention may be more readily grasped I shall proceed to describe it with reference to the accompanying diagrams which illustrate the main principle of my invention and how it may be carried into effect.

In the drawings Figure 1 represents one form of my invention and Fig. 2 another form.

In Fig. 1 of the said diagrams, 1 is the main core and 2, 2′ switches or circuit breakers, placed one at each end of the feeder, which are designed to be tripped or opened on leakage in the feeder taking place.

3, 4 are the balancing strands one of which, 3, is electrically connected (as diagrammatically shown by the conductor 5) with the main core 1.

6, 6′ are differential electromagnetic devices which in the case of alternating current systems, are preferably balancing transformers of a kind described in the specification accompanying my application for Letters Patent of the United States, filed 31st July 1911, under serial No. 641,511.

7, 7′ are solenoids connected with the balancing transformers as shown and 8, 8′ are the solenoid cores or extensions thereof serving to open or trip the switches 2, 2′.

The action is as follows: Let us assume current is flowing from the point 2 along the feeder 1 to the point 2′. There is a gradual and uniform drop of potential along the main core between 2 and 2′. What is more there is a similar gradual and uniform drop of potential from 2 to 2′ along the strand 3 and from 2 to 2′ along the strand 4. There being no difference of potential, then, between corresponding or contiguous points of the wires, 1, 3 and 4, there is, under normal conditions, no current in the connecting conductor 5 and, the resistances of the wires 3 and 4 being the same, there is as much current in 3 as in 4. This means the transformers 6 and 6′ are balanced and that no current is induced in the coils 7 and 7′. The switches 2 and 2′ thus remain closed. Assume now that there is a leak or ground between the point 2′ and the conductor 5 on the main feeder 1. Clearly there is an additional path established for current through the wire 3: not only the original path from 2 through both transformer coils to 2′ but also a new path from 2 through the conductor 5 to earth. There is, however, no new path established for the current through the wire 4. Hence the same amount of current will no longer flow in the strands 3 and 4; the transformers 6 and 6′ will become unbalanced, current will be induced in the coils 7 and 7′, the cores 8 and 8′ will be magnetized and the switches 2 and 2′ will be opened to cut the grounded feeder out of the distribution system.

Fig. 2 of the accompanying diagrams illustrates a modification in which resistances are used if the system be of the more usual direct current variety and impedances 9, 9' are used if an alternating current system be employed. In either case, I call these parts current obstructors and they are inserted between the ends of the main core of the feeder 1 and the switches 2, 2'. I have found that by this means I increase the sensitiveness to faults near the end of the feeder. Without these resistances or impedances the sensitiveness in the case of a fault is greater (in the case shown in Fig. 4) at the middle or the point of connection of the conductor 5 and decreases toward the switches 2, 2'. When however the resistances or impedances are in circuit as shown the sensitiveness does not fall below a given value at any point of the feeder.

It will be seen that when there is no leakage from the main core the switches will not be operated as the currents in the two balancing strands will be equal.

To prevent any inequality of current in the two balancing strands due to induction I prefer to twist them relatively to the main core of the feeder cable in a well known manner.

It is not necessary (but as hereinbefore stated it is desirable) that the balancing strands should be in fact strands forming part of the same cable core with the main core of the feeder cable. They might instead be separate parallel insulated conductors taking their desired proportions of the total feeding current. I however prefer to strand and twist the conductors as hereinbefore mentioned. Nor is it necessary that the electrical connection between one of the balancing strands and the main core should be by a distinct conductor as 5. In practice such connection could be made by mere absence of insulation at a point of contact. Thus at the point of connection the insulation might be cut away for a small distance and the bare conductors brought together and maintained in contact by a clip or ligature or the like, a suitable insulating covering being then put over the joint for protection. I may also make up a number of cores with balancing strands into a feeder cable.

I use the term differential electromagnetic device to cover all electromagnetic devices controlled by two currents which become effective when the normal flow of the two currents is sufficiently changed. The term balancing transformer indicates a type of differential electromagnetic device especially usable for alternating currents in which two primary coils, wound on the same transformer core, normally counteract each other, but cease to do so when the normal flow of the currents in these primary coils is sufficiently changed, in which case the secondary coil becomes active.

I have clearly defined the meaning of the terms differential electromagnetic device and balancing transformer, although I submit that these are terms well understood in the art. So, too, I am aware that there exist many kinds of differential electromagnetic devices, in arc lamps, in telephone receivers, in railroad signal systems, in call systems and so on. My claims do not rely upon the specific construction of the differential device but cover broadly the use of any such device in connection with the balancing strands, the main core and the circuit breaker.

Having thus described my invention, what I claim as new and desire to secure by Letters Patent is:—

1. In an electrical distribution system, a main core, a circuit breaker therein, two balancing strands connected to the core at their ends and one of which is electrically connected with the main core at an intermediate point, and a differential electromagnetic device for actuating the circuit breaker controlled by the balancing strands, substantially as described.

2. In an electrical distribution system, a main core, a circuit breaker therein, two balancing strands connected to the core at their ends and one of which is electrically connected with the main core at an intermediate point, a current obstructor near the end of the main core, and a differential electromagnetic device for actuating the circuit breaker controlled by the balancing strands substantially as described.

3. In an alternating current distribution system, a main core, a circuit breaker therein, two balancing strands connected to the core at their ends and one of which is electrically connected with the main core at an intermediate point, and a balancing transformer for actuating the circuit breaker controlled by the balancing strands substantially as described.

4. In an alternating current distribution system, a main core, two circuit breakers near its ends, two balancing strands connected to the core at their ends and one of which is electrically connected with the main core between its ends, and two balancing transformers for actuating the circuit breakers controlled by the balancing strands, substantially as described.

In witness whereof I have signed my name to this specification in the presence of two subscribing witnesses.

PHILIP VASSAR HUNTER.

Witnesses:
H. NIXON,
FRED H. DUKE.